United States Patent [19]

Kaule et al.

[11] 4,442,170

[45] Apr. 10, 1984

[54] SECURITY DOCUMENT WITH SECURITY FEATURES IN THE FORM OF LUMINESCING SUBSTANCES

[75] Inventors: Wittich Kaule, Gauting; Gerhard Schwenk, Puchheim; Gerhard Stenzel, Munich, all of Fed. Rep. of Germany

[73] Assignee: GAO Gesellschaft fur Automation und Organisation mbH., Munich, Fed. Rep. of Germany

[21] Appl. No.: 314,840

[22] PCT Filed: May 29, 1981

[86] PCT No.: PCT/DE81/00080

§ 371 Date: Oct. 23, 1981

§ 102(e) Date: Oct. 23, 1981

[87] PCT Pub. No.: WO81/03509

PCT Pub. Date: Dec. 10, 1981

[30] Foreign Application Priority Data

May 30, 1980 [DE] Fed. Rep. of Germany ....... 3020601

[51] Int. Cl.³ ..................... B32B 21/04; G01N 21/38
[52] U.S. Cl. .................................. 428/333; 428/403; 428/438; 428/916; 428/917; 428/918; 428/690; 428/908; 428/323; 428/207; 356/71; 250/271; 283/92; 283/94; 101/DIG. 25
[58] Field of Search ............... 428/916, 690, 917, 918, 428/913, 537, 333, 438, 403

[56] References Cited

U.S. PATENT DOCUMENTS

| | | |
|---|---|---|
| 2,704,634 | 3/1955 | Rauch . |
| 3,208,009 | 7/1965 | Etzel et al. . |
| 3,412,245 | 11/1968 | Halverson . |
| 3,455,577 | 7/1969 | Kikumoto et al. . |
| 3,473,027 | 10/1969 | Freeman et al. . |
| 3,480,877 | 11/1969 | Dillon et al. . |
| 3,525,698 | 8/1970 | Leto et al. . |
| 3,533,176 | 10/1970 | Weitzberg et al. ............. 428/916 X |
| 3,654,463 | 4/1972 | Geusic et al. . |
| 3,928,226 | 12/1975 | McDonough et al. ......... 428/916 X |
| 4,047,033 | 9/1977 | Malmberg et al. . |
| 4,152,483 | 5/1979 | Kanda et al. . |
| 4,202,491 | 5/1980 | Suzuki . |

FOREIGN PATENT DOCUMENTS

| | | |
|---|---|---|
| 449133 | 8/1927 | Fed. Rep. of Germany . |
| 497037 | 4/1930 | Fed. Rep. of Germany . |
| 1449107 | 9/1969 | Fed. Rep. of Germany . |
| 1524711 | 7/1970 | Fed. Rep. of Germany . |
| 2102120 | 7/1971 | Fed. Rep. of Germany . |
| 1599011 | 2/1972 | Fed. Rep. of Germany . |
| 2318716 | 4/1973 | Fed. Rep. of Germany . |
| 2547768 | 7/1976 | Fed. Rep. of Germany . |
| 2745301 | 4/1979 | Fed. Rep. of Germany . |
| 2754369 | 6/1979 | Fed. Rep. of Germany . |
| 2903073 | 8/1979 | Fed. Rep. of Germany . |
| 1186253 | 4/1970 | United Kingdom . |
| 1326665 | 8/1973 | United Kingdom . |
| 1484471 | 9/1977 | United Kingdom . |

OTHER PUBLICATIONS

Dobrowolski et al, "Optical Interference Coatings for Inhibiting of Counterfeiting", Optica Acta, V. 20, #12, 1973, pp. 925-937.

Primary Examiner—P. Ives
Attorney, Agent, or Firm—Schwartz, Jeffery, Schwaab, Mack, Blumenthal & Koch

[57] ABSTRACT

Security paper with narrow band luminescing authenticity characteristics which can only be excited in substantially the same wavelength region in which it also emits. With these authenticity characteristics therefore the authenticity signal is overlapped or covered by the test signal of several orders of magnitude stronger. The authenticity of the security papers cannot accordingly be tested with the normal processes or devices for determining of luminescence. The test devices used take advantage of the decay behavior of the luminescence emission for detection. The authenticity characteristics can be added to the paper material, the printing ink used, further mottling fibres or security threads.

16 Claims, 2 Drawing Figures

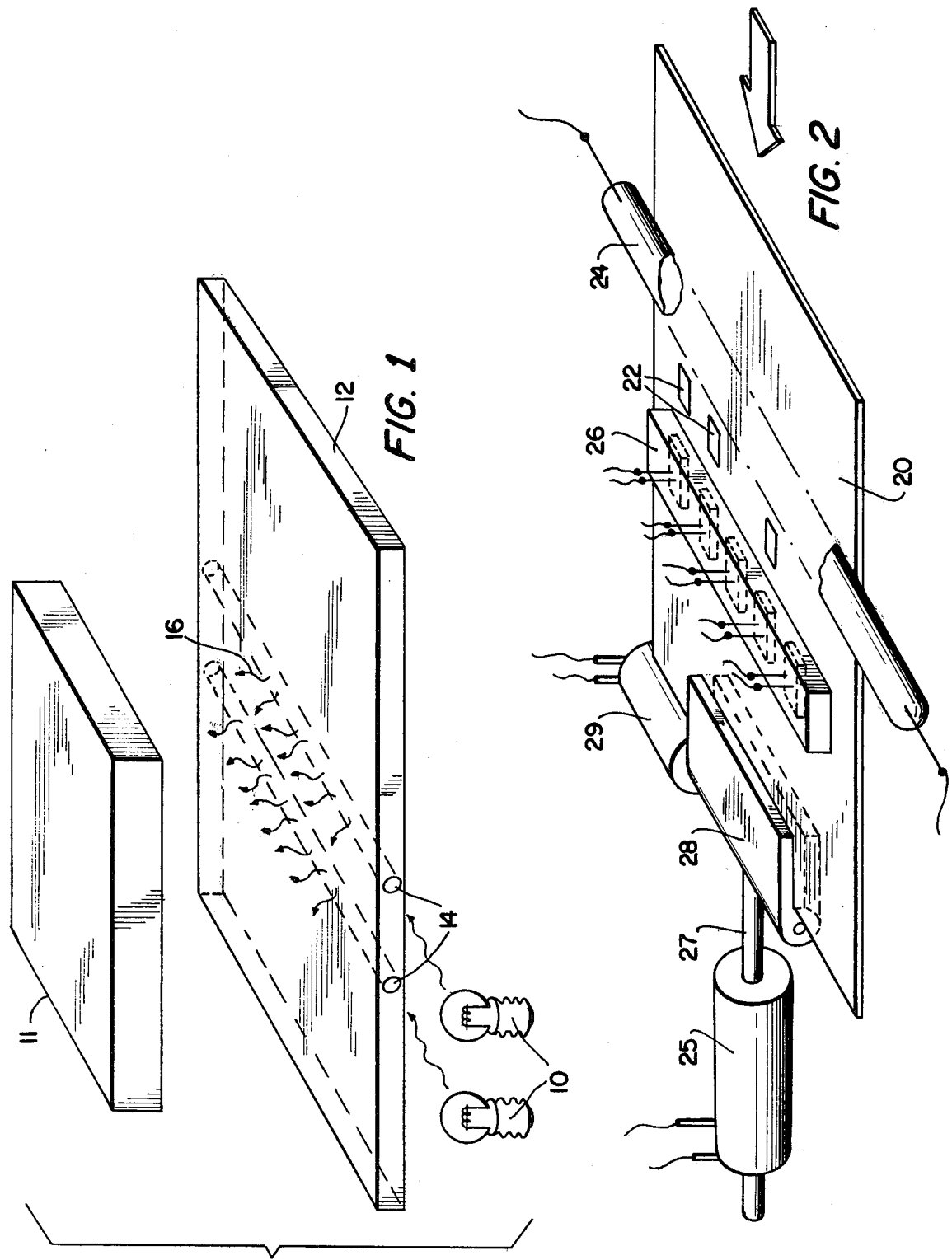

SECURITY DOCUMENT WITH SECURITY FEATURES IN THE FORM OF LUMINESCING SUBSTANCES

BACKGROUND OF THE INVENTION

The invention relates to a security paper with security features in the form of luminescing substances and a process for authenticity determination.

The term "security paper" it is to be understood includes bank notes, check forms, shares and stamps as well as passes, credit cards, check cards, passports, air tickets and other certificates and documents.

The rendering of security papers secure against forgery by luminescing substances has already been known for a along time. Already in German Pat. No. 449 133 from the year 1925 and German Pat. No. 497 037 from the year 1926 the introduction of luminescing substances into security papers is described, wherein the luminophores are excitable with ultraviolet or other invisible radiation and emit in the visible region.

In U.S. Pat. No. 3,473,027 coding inks are described with photoluminescent components on the basis of host lattices doped with rare earth metal ions which can be codoped with one or more dopants according to U.S. Pat. No. 3,525,698. The excitation takes place in the UV-region and short wave visible region and the emission in the visible or IR-region, wherein the emissions in the IR-region can be referred to for broadening the usable spectral range.

The rare earth luminophores described in German Offenlegungsschrift No. 25 47 768 are excited in the IR-region and emit in the visible region.

The use of luminophores for rendering security papers secure is further described in German Offenlegungsschrift No. 15 99 011.

In known security paper luminescing substances, luminophores are chosen the emission of which takes place at a comparatively great spectral distance from the excitation, in order to ensure that the emission characteristics can be determined without the disturbing influence of the excitation light.

Further, in patent literature, numerous proposals for the modification of luminophores, have been made. Examples of such proposals include the combination of a luminophore with other substances, coating a luminophore and encapsulation of a luminophore. These proposals relate to varied purposes including the changing of the spectral regions.

Thus, it has been suggested to improve the chemical resistance of luminophores by covering them with certain substances. In the case of luminescence screens for the multi-color illustration of images, part of the luminescent material has been coated with a barrier layer. In the manufacture of cathode ray tubes for color television receivers it is known to coat the luminescent materials with pigments in order to increase the contrast.

For improving the picture on screen tubes for color television receivers it is further known to suppress undesired emissions of the luminescent materials by pigment coating. In this connection attention can be directed, for example, to German Offenlegungsschrift No. 27 54 369 and U.S. Pat. No. 4,152,483.

It is also known, for example, from British Pat. No. 1 484 471 to broaden the excitation region of a luminophore by combination with a second luminophore.

Further, in German Offenlegungsschrift No. 21 01 120 the coating of luminophores with multiple dielectric layers is described in order to suppress a part of the emission spectrum and in this way to increase the intensity at other wavelengths.

In German Offenlegungsschrift No. 15 99 011 it has already been proposed to cover luminophores which are to be used for rendering identity cards and the like secure with a foil in order to avoid the security feature being able to be detected with the naked eye.

Finally, it is known from British Pat. No. 1 186 253 to mask indicia with luminescing substances partly with dyestuffs which are opaque to the emission of radiation in order thereby to be able to pick out particular indicia such as letters.

In rendering security papers with authenticity features in the form of luminescing substances secure the numerous modifications of luminophores proposed for various purposes have not found any use. As the effort in connection with authenticity features for security papers lay rather in the choice of suitable luminophores the excitation and emission of which had large spectral shift in order to enable identification in the most simple and sure way possible without disturbance from the excitation light.

An important disadvantage of the luminophores used in security papers accordingly lies in the fact that the luminescence can be determined with commercially available devices and from the luminescence characteristics one can exclude the presence of certain luminophores. It would however be more advantageous if with normal means the luminescence overall could not be able to be determined.

SUMMARY OF THE PRESENT INVENTION

The object underlying the present invention is to produce a security paper with authenticity features in the form of luminescing substances in which the luminescence is not observable with customary means.

The basis underlying the invention is the discovery that this problem can be solved in that the security paper is provided with luminophores which show an emission only spectrally close to the excitation region, so that the emission is swamped by the excitation light.

BRIEF DESCRIPTION OF THE DRAWINGS

FIG. 1 is a schematic illustration showing a testing principle to be used with a security paper according to the present invention; and FIG. 2 is a schematic illustration showing a device for use in testing security papers according to the present invention.

DETAILED DESCRIPTION OF THE PREFERRED EMBODIMENTS

The subject of the invention is a security paper with luminescing authenticity features which is characterised in that at least a part of the luminescing features can be excited exclusively in a narrow wavelength region and also emit in this same or a closely neighbouring wavelength region.

The subject of the invention furthermore is a process for authenticity determination of security papers containing luminescing substances by excitation with electromagnetic radiation and observation of the excitation and/or emission characteristics which is characterised in that the excitation of the luminescing substances takes place spectrally in the region of the emission which is evaluated.

In the case of the luminescing substances used in the security papers according to the invention, an effect is accordingly made use of which is very similar to the resonance fluorescence of gases and which accordingly will be denoted as quasi-resonant luminescence.

Resonance fluorescence is the phenomenom known in the case of the luminescence of gases that excitation and emission take place at the same point in the spectrum; it arises only in the case of gases under low pressure, since in these the molecules interact with one another relatively little. The energy received as a result of the excitation has, due to a lack of interaction with the environment, no possibility of being lost partly to other processes. The emission accordingly takes place with the same quantum energy i.e. wavelength and frequency, as the excitation.

Also rare earth metals which are inserted "diluted" into host lattices show a similar effect. Since the optically active inner shells in the atomic structure of rare earth metals are shielded by outer shells, and because of the diluted insertion into the host lattice, the interaction with the surroundings is relatively small. From this results the very narrow band excitation and emission lines of rare earth metal luminophores.

The quasi-resonant luminescence of rare earth metal luminophores is known from research work for laser materials. For example attention can be directed to U.S. Pat. No. 3,208,009 in which a solid body laser activated with trivalent ytterbium is described, which is excited at 914 to 974 nm and emits at 1015 nm. In the prior art, the preferred rare earth metal luminophores for rendering security papers secure were those in which the base lattice and the dopant were so chosen that the lattice was excited in a particular wavelength region, for example, in the UV- or IR-region, and the excitation energy was transferred by means of "energy transfer" to the rare earth metal ion and this emitted the energy in a spectral region which was greatly separated spectrally from the excitation region.

In contrast to this, according to the invention the emission takes place in the same narrow wavelength region as the excitation or at spectrally closely neighboring wavelengths. An "energy transfer" is avoided. Spectrally separately lying emissions are, if they additionally arise, suppressed by special masking processes.

In order to achieve the effect according to the invention the wavelength region should not be detectable for example, by commercially available dyestuff filters or colored glasses. As a rule, this condition is fulfilled if the region has a breadth of about 100 nm, preferably approximately 50 nm and less.

Suitable luminophores which even without additional measures only show a quasi-resonant luminescence can be prepared by appropriate choice of suitable base lattices and active dopants.

According to the invention, however, one is not restricted in the choice of luminophores to those which per se only show quasi-resonant luminescence, for according to the invention those luminophores can also be used which addition to the quasi-resonant luminescence show one or more normal luminescence emissions, if in such cases care is taken that these non-desired emissions are suppressed.

The suppression of non-desired emissions can take place by the use of masking substances which absorb in each wavelength region in which the luminophore has an undesired emission or allows an undesired excitation. Dyestuffs and colored pigments are suitable for use as masking substances. Preferably a luminophore is coated with the masking substance. The feature materials can however, also be manufactured by mixing the luminescence material and masking substance. A further possibility is the application of the feature material in or on to the security paper and subsequent coating with the masking substance; yet a further possibility is the introduction of luminescing dopants into host substances which because, of their optical properties, can simultaneously take over the masking function.

In known security papers containing luminophores, the luminophores are either visible under normal illumination, UV-illumination or IR-illumination, or can be rendered visible with commercially available devices so long as it is possible to separate the excitation light from the the emission.

Since no technical application is known, for the property of "quasi-resonance," no detection devices suitable for this are currently available. On account of the lack of technical application the corresponding luminophores are likewise not available in commerce. This constitutes a substantial security factor.

The possibility of forgeries is accordingly made additionally more difficult.

When using normal luminophores in security papers, care must be taken that both the excitation region and also the emission region must not be interferred with by other additives. In the case of the luminophores used according to the present invention, in contrast only a narrow wavelength region needs to be kept free, because both the excitation and also the emission take place in this region. This is advantageous particularly when using the luminophores as ink additives.

The rare earth metal luminophores used in the security papers according to the invention are generally solvent-fast and pass to all the resistance tests prescribed for bank note colors. In the case of less high requirements concerning resistance, however, naturally also other materials can be used which do not fulfill all these requirements normal in the case of bank note manufacture.

To determine luminescence, no filters are necessary to separate the excitation light and emission spectrally from one another, i.e. the detection apparatus does not need to contain any components from which one could conclude what substance was being detected.

For the manufacture of feature materials particularly valuable from the technical security point of view, the residual illumination time of the luminophores is preferably chosen to be so short that, as a result of the blind time and recovery time of the eye or photo-electrical detection arrangement, the emission after the end of excitation cannot be observed without special means. A further increase in security can be achieved if the quasi-resonant emission takes place in the invisible spectral regions.

On account of the unusual detection process and the difficulty for observers to determine the spectral region, the probability of discovery of the security feature is very small. For less highly critical applications it can be appropriate to simplify the testing device in such a way that luminophores with somewhat longer after emission times and possibly somewhat higher luminescence intensity can be used.

The invention is subsequently described in more detail with reference to Examples.

EXAMPLE 1

86 g Yttrium oxide $Y_2O_3$, 7 g europium oxide $Eu_2O_3$, 40 g sodium carbonate $Na_2CO_3$, 40 g sulphur S and 20 g potassium phosphate $K_3PO_4$ were intimately mixed and calcined in a corundum crucible in air at 1100° C. for four hours.

After cooling the sintered product was milled, the excess sodium polysulphide which had arisen dissolved out with water, the residue of europium-doped yttrium oxysulphide micronised in a stirring ball mill and re-crystallised at 500° C.

Europium-activated yttrium oxysulphide with the composition $Y_{1.9}Eu_{0.1}O_2S$ and an average particle size of 0.5 μm was obtained as colorless powder.

The product showed under UV-irradiation a red luminescence at 630 nm. This group of lines is however excitable not only with UV-light but also in quasi-resonance.

In order to avoid the possibility of exciting by UV, the powder was together with a UV-absorbing dyestuff which however was transparent in the region of the red luminescence, embedded in a synthetic resin.

For this purpose, they were mixed in a heatable kneader having 0.6.1 useful capacity 200 g of the product with 34 g isophorone diisocyanate, 17 g toluene sulphonamide, 10 g melamine and 10 g Permanent Yellow GR 36 L (registered Trade Mark of the firm Hoechst). The temperature was slowly increased to 140° C., whereon a homogeneous composition arose which after ten minutes polymerized to a brittle solid body with exothermic reaction giving a temperature rise to 200° C.

The product was then held for a further 20 minutes at 180° C. and then after cooling, milled to a fine yellow powder in a nail mill.

The so-obtained pigment showed on excitation with UV-light no luminescence but was excitable at 630 nm into quasi-resonance.

The pigment is suitable for mixing into printing inks, whereby the quasi-resonant luminescence is not adversely affected if a coloring material transmissing in the resonance region e.g. Hansa Yellow, Helio-Orange, Permanent Red or Hostaperm Violet (registered Trade Marks of the firm Hoechst) is used.

EXAMPLE 2

100 g Europium-activated yttrium oxysulphide $Y_{1.9}Eu_{0.1}O_2S$ made according to Example 1 were mixed, instead of, with the noted dyestuff with 10 g 2,4-dihydroxybenzophenone.

On excitation with UV light this mixture showed no luminescence but it had a red luminescence at 630 nm which could be excited into quasi-resonance.

This mixture is wholly colorless and accordingly suited for colorless prints on security papers.

EXAMPLE 3

293 g Lanthanum oxide $La_2O_3$ and 39.4 g ytterbium oxide $Y_2O_3$ were dissolved in hot concentrated nitric acid and precipitated with oxalic acid as oxalate.

The dried mixed oxalate was transferred into a crucible of very pure aluminum oxide $Al_2O_3$ and calcined for 24 hours at 1300° C.

The product, ytterbium activated lanthanum oxide, had the composition $(La_{0.9}Yb_{0.1})_2O_3$ and was colored pure white. After milling on a jet mill, the product was obtained with an average particle size of 1 μm.

The luminophore showed a luminescence which could be excited in quasi-resonance at 950 nm. In the UV-region it further showed a weak possibility of excitation.

For avoiding this 200 g of the luminophore were mixed with 10 g m-hydroxyphenylbenzoate $C_{13}H_9O_3$.

The mixture showed no luminescence on excitation with UV-light but a luminescence at 950 nm which could be excited in quasi-resonance.

Since the quasi-resonance is only used in the IR and the visible regions of the optical spectrum are not traversed, the luminophore can be combined with any dyestuff or dyestuff mixture desired provided that the dyestuff or dyestuff mixtures are transparent for the wavelength region from 900 nm to 1000 nm. Colored pigments with these properties are available for all color tones including colorless and black.

EXAMPLE 4

94 g Calcium carbonate $CaCO_3$ and 5.8 g thulium oxide $Tm_2O_3$ were dissolved in hydrochloric acid HCl. With caustic soda NaOH a pH value of 10 was adjusted and precipitation effected with an aqueous sodium tungstate solution.

The mixed tungstate resulting was mixed with 120 g sodium tungstate $Na_2WO_4$, transferred to a crucible of aluminum oxide and calcined for 4 hours at 1100° C.

After cooling the fluxing agent was washed out with water.

A white powder of a composition $Na_{0.03}Ca_{0.94}Tm_{0.03}WO_4$ with an average particle size of 2 μm was obtained.

This thulium-activated calcium tungstate showed on excitation with UV-light a blue luminescence at 480 nm as well as luminescences in the IR at 800 and 1700nm. The emission at 1700 nm could be excited also in quasi-resonance.

The luminescences at 480 and 800 nm could be suppressed by a combination with a mixture of suitable absorbing dyestuffs and an IR-absorber; a suitable such mixture consists for example of the Ni complex or bis-dithio-diketone as IR-absorber and a dyestuff mix of 3 parts Chrome Yellow (registered Trade Mark of the firm Siegle and Co.), 3 parts Lithol Ruby and 2 parts Heliogen Blue (registered Trade Mark of the firm BASF).

Since the luminescence at 1700 nm which can be excited by quasi-resonance lies in the middle IR-region, for the example given above all organic dyestuffs and pigments with the exception of carbon black can be used to suppress the undesired emissions.

The emissions disappear with the exception of the quasi-resonance also if only the excitation region in the UV is suppressed, for example by means of 2,4-dihydroxybenzophenone. This is advantageous insofar as thereby a wholly colorless security material is then available.

The security papers according to the invention can be provided with the luminophores in manifold fashion. The luminophores can be in the printing ink, in the paper or in a security thread.

Of particular importance in this connection is that the luminophore can be combined with a plurality of dyestuffs and pigments for only a small spectral region must be maintained free for excitation and emission.

The luminophores can, for example, be embedded in a resin during the manufacture of a coloring material. They can also be coated with the masking substances and then added to the printing ink. Furthermore the luminophores can be added in admixture with the masking substance to the printing ink or can be screened with a printing ink in such a way that the suppression of damaging excitations or emissions is taken over by the printing ink itself. Furthermore, it is possible that the feature material is introduced into the paper or applied on the security thread foil. The masking substance can if desired also be present dissolved in a varnish. Furthermore it can be the case that a printed image resulting from printing ink containing the luminophore is coated with a color which contains the masking substance e.g. by overprinting with a corresponding printing ink.

Special difficulty concerning detecting the quasi-resonance exists in the fact that the spectral regions of excitation radiation and emitted luminescence radiation overlap. Separation by filters, as otherwise would be carried out, is accordingly not possible. The possibilities for detection accordingly restrict themselves essentially to the evaluation of the decay time (which even so for quasi-resonance is particularly hard to measure) and the changed direction of the luminescence radiation in comparison to the excitation light.

A device suitable for determining the decay time is described for example in German Offenlegungsschrift No. 1 524 711. In this device the security paper to be tested is illuminated in pulsed fashion in the region of the feature with suitable radiation by means of a flashlamp. The emitted luminescence radiation is spectrally split and the different spectral radiation regions are sampled in time sequence by means of a rotating slot shutter. If quasi-resonance is not present, then with this device one can determine the different decay times of the various luminescences since the excitation light which is more intensive compared to the luminescence light by many orders of magnitude can be shielded from the detectors by optical filters.

In the case of quasi-resonance this spectral shielding is not possible; a measurement with the device described in German Offenlegungsschrift No. 1 524 711 depends accordingly on the residual current signal generated by the excitation light which is determined by the response and depletion speed of the photo-electric layer as well as by the RC-time of the measuring electrodes.

From the same publication it is also known that a luminescence signal which is generated by a pulsed light source and which is likewise time-dependant in its intensity can be resolved into direct and alternating current components, the ratio of which is a measurement of the decay time of a particular luminescence material.

A testing process with evaluation of the changed direction of the luminescence radiation compared to the excitation light can for example be used if the luminescing substances are embedded in a layer of the security paper which is optically more highly refractive than the neighboring layers. This condition is fulfilled for example by a glass fibre, a plastic fibre or a plastic foil. The light which is introduced into the more highly refractive layer can on observance of a suitable opening angle, not leave the layer because of total reflection. If the more highly refractive layer is provided with luminescent substances according to the invention, then the luminescence radiation is excitable there which, on account of its direction or distribution substantially independent of the excitation, has portions outside the total reflection angle and which can therefore emerge from the layer.

These portions can be detected in an otherwise conventionally constructed testing device.

In FIG. 1 the testing principle for such a security paper is shown. The excitation light is directed from light sources 10 arranged laterally of the security paper 12 in the direction of the long axis of glass fibres 14 and enters the fibres. The glass fibres contain a luminescing substance at suitable concentration. The glass composition can also itself serve as a sort of "host lattice" for luminescing dopant materials. The emitted luminescence radiation is undirected and emerges to a certain degree on exceeding the boundary angle for reflection out of the glass fibre, as is indicated in the Figure by arrows 16. This radiation can be measured in a suitable device 11 by means of photodiodes without difficulty, whereby the excitation radiation which on account of the total reflection cannot leave the glass fibres remains unobserved.

Subsequently with reference to FIG. 2 a particularly suitable device for testing a security paper according to the invention and provided with printed-on feature materials is explained.

On to the security paper 20 a coding line 22 is applied in the form of individual fields. Line 22 is provided with a luminescing substance according to the invention.

In the device, a flashlamp 24 and a field of photodiodes 26, are separated from one another by a light shield (not shown). The photodiodes are so arranged that they lie exactly over the coding fields in the feature region of the security paper 20.

Furthermore, located in the device is a claw 28 arranged on a gripper arm with which one edge of the security paper can be grasped. The claw 28 is closed by means of a special electromagnet 29. The claw 28 is itself fixed to the gripper arm 27 which by means of a solenoid magnet 25 can be shifted in a longitudinal direction.

On inserting the security paper 20 through a slot in the testing device a positioning stop, for example, a microswitch or a light gate, is operated which releases the starting signal for the following processes. The electromagnet 29 closes the claw 28. The flashlamp 24, which is located exactly over the coding line 22, is simultaneously operated. The claw 28 is pulled to a position under the flashlamp 24 in fractions of a second by means of the solenoid magnet 25 and thus brought under the photodiode field 26 so that the coding line of the security paper is examined at by the photodiodes.

The luminescence radiation emitted from the fields 22 during the excitation by the flashlamp has a certain decay characteristic i.e. the fields glow after the end of excitation for a very short period of time. This "after light" is registered by the photodiodes 26 since the flashlamp 24 and the photodiodes 26 are separated from one another by a light screen. It is accordingly possible to determine the luminescence despite the wavelength lying in the same spectral region as the excitation light.

The flashlamp 24 can obviously also be replaced by suitable light diodes. In place of the claw 28 and the solenoid magnet 25 there can also be provided a transport device, for example a conveyor belt, working with a defined constant speed with which the security paper 20 is moved through below the flashlamp and photodiode field. In this case it is advantageous to use several photodiode fields arranged sequentially in the transport direction. From the relationship of the signals emitted by the sequentially lying photodiodes as well as the simple presence of the luminescence radiation the decay characteristics can be determined.

The devices and circuit arrangements described are of course suitable not only for the detection of quasi-resonance, in which the emission is in the spectral region of the excitation, but also for the detection of every other luminescence with a characteristic decay time.

What is claimed is:

1. Security document with security features comprising:
   a substrate material; and
   a luminescing substance combined with said carrier material, said luminescing substance having a known excitation spectrum and a known emission spectrum wherein at least a portion of said excitation spectrum and at least a portion of said emission spectrum are contained in a narrow band of wavelengths and at least a portion of said excitation spectrum overlaps at least a portion of said emission spectrum in said narrow wavelength band whereby said luminescing substance operates in a quasi-resonant mode.

2. Security document according to claim 1 wherein said luminescing material includes a masking substance which has an absorption spectrum including portions of the excitation and emission spectrums which lie outside of said narrow band of wavelengths.

3. Security document according to claim 1 or 2 wherein said narrow wavelength band has a width of 100 nm.

4. Security document according to claim 2 wherein said masking substance is a material selected from the group consisting of dyestuffs, colored pigments, infrared absorbers, ultraviolet absorbers, and mixtures thereof.

5. Security document according to claim 2 wherein the luminescence materials are mixed with the masking materials.

6. Security document according to claim 2 wherein the luminescence materials are coated with the masking substances.

7. Security document according to claim 2 wherein the luminescence materials are overprinted with the masking materials.

8. Security document according to claim 1 wherein the luminescing substance comprises printing on said substrate.

9. Security document according to claim 1 wherein the luminescing substrate is distributed throughout the volume of said substrate material.

10. Security document according to claim 1 including an optically transparent layer connected to said substrate material, said optically transparent layer being optically more highly refractive than its surroundings, wherein said luminescing substance is inlaid in said optically transparent layer.

11. Security document according to claim 10 wherein the optically transparent, more highly refractive layer comprises at least one glass fiber.

12. Security document according to claim 10 wherein the optically transparent, more highly refractive layer comprises at least one plastic fiber.

13. Security document according to claim 10 wherein the optically transparent, more highly refractive layer comprises at least one plastic foil.

14. Security document according to claim 1 wherein said narrow wavelength has a width of 50 nm.

15. Security document according to claim 1 wherein said narrow wavelength band is identical with said overlapping portion.

16. Security document according to claim 1 wherein said narrow wavelength band frames said overlapping portion.

* * * * *